(12) United States Patent
Wodnicki et al.

(10) Patent No.: US 8,345,508 B2
(45) Date of Patent: Jan. 1, 2013

(54) LARGE AREA MODULAR SENSOR ARRAY ASSEMBLY AND METHOD FOR MAKING THE SAME

(75) Inventors: Robert Gideon Wodnicki, Niskayuna, NY (US); Rayette Ann Fisher, Niskayuna, NY (US); Charles Gerard Woychik, Niskayuna, NY (US); Shubhra Bansal, Niskayuna, NY (US); Albert Taesung Byun, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 374 days.

(21) Appl. No.: 12/714,239

(22) Filed: Feb. 26, 2010

(65) Prior Publication Data

US 2011/0071397 A1    Mar. 24, 2011

Related U.S. Application Data

(60) Provisional application No. 61/244,069, filed on Sep. 20, 2009.

(51) Int. Cl.
*G03B 42/06* (2006.01)

(52) U.S. Cl. ........................................... 367/7

(58) Field of Classification Search ................ 367/7, 11; 600/459; 288/179.1
See application file for complete search history.

(56) References Cited

U.S. PATENT DOCUMENTS

| | | |
|---|---|---|
| 5,527,741 A | 6/1996 | Cole et al. |
| 5,622,177 A | 4/1997 | Breimesser et al. |
| 5,732,706 A | 3/1998 | White et al. |
| 6,013,032 A | 1/2000 | Savord |
| 6,282,963 B1 | 9/2001 | Haider |
| 6,346,079 B1 | 2/2002 | Haider et al. |
| 6,359,367 B1 | 3/2002 | Sumanaweera et al. |
| 6,491,634 B1 | 12/2002 | Leavitt et al. |
| 6,506,160 B1 | 1/2003 | Van Stralen et al. |
| 6,541,896 B1 | 4/2003 | Piel, Jr. et al. |
| 6,589,180 B2 | 7/2003 | Erikson et al. |
| 6,789,888 B2 | 9/2004 | Kiyama |
| 6,865,140 B2 | 3/2005 | Thomenius et al. |
| 7,052,464 B2 | 5/2006 | Wodnicki |
| 7,053,530 B2 | 5/2006 | Baumgartner et al. |

(Continued)

FOREIGN PATENT DOCUMENTS

JP    2011078755 A  *  4/2011

(Continued)

OTHER PUBLICATIONS

Co-pending U.S. Appl. No. 11/172,599, filed Jun. 29, 2005, entitled "Transmit and Receive Interface Array for Highly Integrated Ultrasound Scanner".

(Continued)

*Primary Examiner* — Daniel Pihulic
(74) *Attorney, Agent, or Firm* — Scott J. Asmus

(57) ABSTRACT

A modular and tileable sensor array with routing in the interposer carrying the signals from the sensors to the integrated circuits. In one embodiment a large area modular sensor array assembly includes one or more tileable modules coupled together. The tileable modules have a plurality of transducer cells forming a sensor, an interposer coupled on a first side to the plurality of transducer cells by a plurality, one or more integrated circuits coupled to a second side of the interposer, wherein the interposer is configured to form the connection of at least some of the transducer cells to the integrated circuits, and one or more input/output connectors coupled to the interposer and providing an external interface.

20 Claims, 12 Drawing Sheets

U.S. PATENT DOCUMENTS

| | | | |
|---|---|---|---|
| 7,375,420 | B2 | 5/2008 | Fisher et al. |
| 7,775,979 | B2 * | 8/2010 | Thomenius et al. .......... 600/450 |
| 2001/0043090 | A1 | 11/2001 | Savord |
| 2004/0113524 | A1 | 6/2004 | Baumgartner et al. |
| 2005/0094490 | A1 | 5/2005 | Thomenius et al. |
| 2005/0096546 | A1 | 5/2005 | Hazard et al. |
| 2006/0118939 | A1 | 6/2006 | Fisher et al. |
| 2007/0016026 | A1 | 1/2007 | Thomenius et al. |
| 2008/0183078 | A1 | 7/2008 | Haider et al. |
| 2008/0229835 | A1 * | 9/2008 | Davidsen et al. ............... 73/629 |
| 2008/0273424 | A1 | 11/2008 | Wodnicki et al. |
| 2008/0294046 | A1 | 11/2008 | Chiang et al. |
| 2008/0315331 | A1 | 12/2008 | Wodnicki et al. |
| 2009/0146695 | A1 | 6/2009 | Schweizer et al. |
| 2009/0182229 | A1 | 7/2009 | Wodnicki |
| 2009/0182233 | A1 | 7/2009 | Wodnicki |
| 2011/0071397 | A1 * | 3/2011 | Wodnicki et al. ............. 600/459 |

FOREIGN PATENT DOCUMENTS

| | | | |
|---|---|---|---|
| WO | WO2004052209 | A1 | 6/2004 |
| WO | WO2006054260 | A1 | 5/2006 |
| WO | WO2006075283 | A2 | 7/2006 |
| WO | WO2006131875 | A2 | 12/2006 |

OTHER PUBLICATIONS

Wygant et al., "A Miniature Real-Time Volumetric Ultrasound Imaging System", Proc. of SPIE, vol. 5750, pp. 26-36, 2005.

Beyne, "The Rise of the 3rd Dimension for System Integration", Interconnect Technology Conference, 2006 International, pp. 1-5, Jun. 5-7, 2006.

Fisher et al., "Reconfigurable Arrays for Portable Ultrasound", 2005 IEEE Ultrasonics Symposium, vol. 1, pp. 495-499, Sep. 18-21, 2005.

Brunner, "Ultrasound System Considerations and their Impact on Front-End Components", Analog Devices, Inc., 19 pages, 2002.

Savord et al., "Fully Sampled Matrix Transducer for Real Time 3D Ultrasonic Imaging", Ultrasoncs Symposiu, IEEE, vol. 1, pp. 945-953, Oct. 5-8, 2003.

Patti, "Three-Dimensional Integrated Circuits and the Future of System-on-Chip Designs", Proceedings of the IEEE, vol. 94, No. 6, pp. 1214-1224, Jun. 2006.

Zhuang et al., "Wafer-Bonded 2-D CMUT Arrays Incorporating Through-Wafer Trench-Isolated Interconnects With a Supporting Frame", IEEE Transactions on Ultrasonics, Ferroelectrics, and Frequency Control, vol. 56, No. 1, pp. 182-192, Jan. 2009.

Fisher et al., "Packaging and Design of Reconfigurable Arrays for Volumetric Imaging", 2007 IEEE Ultrasonics Symposium, pp. 407-410, Oct. 28-31, 2007.

Doutreloigne et al., "A Versatile Micropower High-Voltage Flat-Panel Display Driver in a 100-V 0.7-µm CMOS Intelligent Interface Technology", IEEE Journal of Solid-State Circuits, vol. 36, No. 12, pp. 2039-2048, Dec. 2001.

Becks et al., "A MCM-D-type Module for the ATLAS Pixel Detector", IEEE Transactions of Nuclear Science, vol. 46, No. 6, pp. 1861-1864.

Wygant et al., "A Miniature Real-Time Volumetric Ultrasound Imaging System", Medical Imaging and Signal Processing, Proc. of SPIE, vol. 5750, pp. 26-36, Apr. 2005.

* cited by examiner

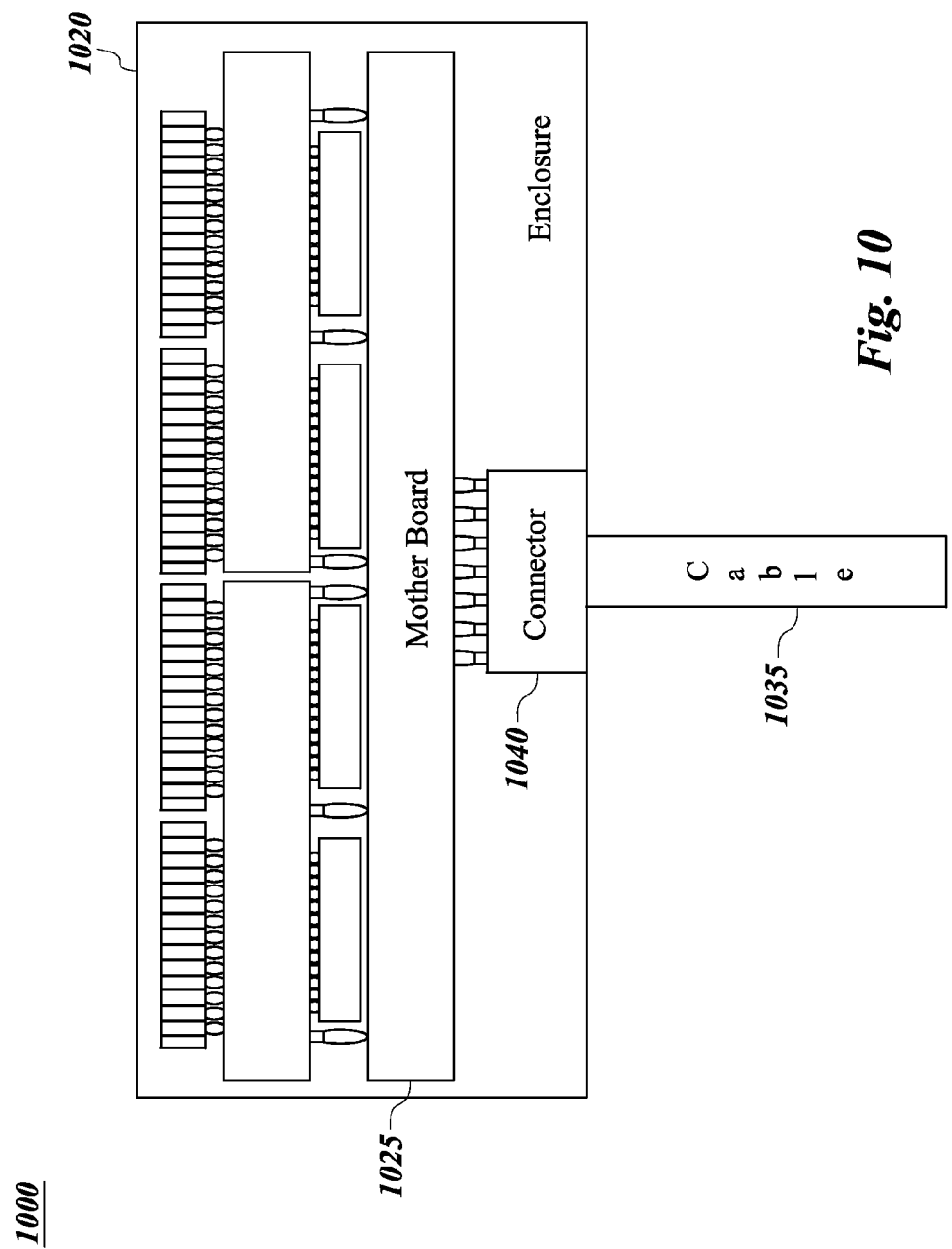

LARGE AREA MODULAR SENSOR ARRAY ASSEMBLY AND METHOD FOR MAKING THE SAME

CROSS REFERENCE TO RELATED APPLICATIONS

This application claims the benefit of U.S. Provisional Application No. 61/244,069, filed Sep. 20, 2009, which is herein incorporated in its entirety by reference.

GOVERNMENT LICENSE RIGHTS

This invention was made with government support under Grant Number R01CA115267 awarded by National Institute of Biomedical Imaging and Bioengineering (NIBIB). The government has certain rights in the invention.

BACKGROUND

Ultrasound monitoring and imaging systems use transducer arrays to create short high frequency acoustic pulses that undergo reflection from surface interfaces at which there are changes in acoustic impedance. The transducers convert reflected energy into electrical signals that are processed to generate two-dimensional or three-dimensional image information descriptive of a subject under study.

There are a number of applications in which large area 'patch' type ultrasound transducer arrays can be used, such as cancer screening and continuous non-invasive blood pressure monitoring. Depending on the application, the element count for the large area transducer can range from 10,000 to >1,000,000. Given the large number of transducer elements, each with its own respective signal processing circuitry, significant power, cost, and area penalties exist.

One way to reduce the number of signal processing channels for such a large area array is through the use of a Mosaic Annular Reconfigurable Array. Capacitive Micromachined Ultrasonic Transducers (cMUTs), which are Micro-Electro-Mechanical Systems (MEMS) structures are also alternatives to traditional PZT-based ultrasound transducers.

With respect to ultrasound probe applications, the transducer arrays in ultrasound probe assemblies typically span an area of about 10 $cm^2$. For new medical applications, such as screening for internal bleeding and tumors, much larger arrays, on the order of 1000 $cm^2$, are required. In non-medical applications even larger arrays are desired.

Such large arrays may be formed by tiling a large number of transducer modules, with each transducer module comprising a subarray of transducer cells and an integrated circuit coupled to the subarray. However, performance of a large transducer area is significantly degraded when there are significant gaps as well as variations in spacings between modules.

The Mosaic Array architecture typically groups a number of subelements together along iso-phase lines to form larger transducer elements which are then each connected to a single system channel. In this way, an array that has tens of thousands of active acoustic subelements can be reduced to a much smaller number of system processing channels (e.g. 20-100). This greatly reduces the requirements on the system and makes possible low power and low complexity electronics systems for large area arrays. In order to realize such an array architecture, the switching electronics are typically integrated directly behind the acoustic array. These switching circuits, which are realized using dedicated ASICs, connect directly to each respective subelement and can be programmed to short these elements to one another in a reconfigurable manner. One of the main challenges with such a system is interconnection of the large number of transducers with a respective switching circuit on the adjacent ASICs.

Acoustic transducer cells are typically multi-layered structures comprising piezoelectric or micro-machined transducers configured with electronic circuitry in a probe assembly. The electrical signals are further processed by beam forming circuitry, typically external to the probe assembly, to generate and display images of structures being studied.

For ultrasound probes, it is desirable to contain a portion of the beam forming circuitry integrated with the transducer array, as this can reduce complexities and potentially adverse effects which may result from connecting cables between the transducer probe and an external system that provides signal processing and control functions. For example, with connecting cables extending over distances on the order of several meters significant capacitance effects can arise. Furthermore, signals received from the transducer assembly may be weak, subject to RF interference and may exhibit an undesirably low signal-to-noise (S/N) ratio. To mitigate these effects, front-end circuit cells providing, for example, amplification, pulse generation, and transmit/receive switching, can be integrated with a transducer array.

In the conventional field, sensor/ASIC assemblies are typically not tileable and modularized. Arrays of such assemblies have been built using, for example, flex-based interconnect or wire bonding. Stacked assemblies have been built using interposers and flip-chip bonding of multiple components. However there is an interest in the structure and processing of transducer arrays that alleviate the problems encountered in the existing designs.

BRIEF DESCRIPTION

One embodiment of the present system is a large area modular sensor array assembly having at least one tileable module. The tileable module comprises a plurality of transducer cells forming at least one sensor, an organic interposer bonded on a first side to the plurality of transducer cells, one or more integrated circuits bonded to a second side of the interposer, wherein the interposer includes a plurality of electrical interconnections to at least some of the transducer cells and to at least some of the integrated circuits. There is at least one input/output connector having a length extending substantially orthogonal to the interposer and providing an external interface, wherein a length of the input/output connector is greater than a thickness of the integrated circuit. A substrate is coupled to the tileable module and electrically coupled to the input/output connector.

One method of forming a large area modular sensor array assembly, includes providing a motherboard and coupling one or more tileable modules to the motherboard. The tileable modules comprise bonding a plurality of transducer cells to a first side of the interposer by a plurality of first side bumps, bonding at least one integrated circuit to a second side of the interposer by a plurality of second side bumps, providing a plurality of electrical interconnections in the interposer thereby coupling the transducer cells to the integrated circuits, and forming an input/output connection on the interposer, wherein the input/output connection exceeds a thickness of the integrated circuit thereby providing an electrical connection to the motherboard.

A further embodiment includes a transducer sensor array, having a plurality of transducer cells with some of the cells forming at least one trenched sensor. There are one or more integrated circuits, each integrated circuit having a defined thickness. An organic interposer is sandwiched between the transducer cells and the integrated circuit, with the transducer cells bonded to a first side of the interposer and the integrated circuits bonded to a second side of the interposer. The interposer includes a plurality of electrical interconnections between at least some of the transducer cells and at least some of the integrated circuits. There is at least one input/output connector bonded on the interposer on the same side as the integrated circuits and having a length greater than the defined thickness of the integrated circuit. The input/output connector is electrically coupled to at least one of the transducer cells or the integrated circuits and there is a substrate electrically coupled to the input/output connector with electrical connections from the substrate to external resources.

BRIEF DESCRIPTION OF THE DRAWINGS

The invention will be more clearly understood from the following description wherein one or more embodiments are illustrated, by way of example only, with reference to the accompanying drawings, wherein like reference numbers are used throughout the figures to indicate like features. Individual features in the figures may not be drawn to scale.

FIG. 10 illustrates a cross-sectional view of an additional example of a mounted transducer module according to one embodiment;

DETAILED DESCRIPTION

The systems and methods detailed herein relates generally to diagnostic and medical imaging including such systems as magnetic resonance (MR), computer tomography (CT), nuclear medicine (NM), positron emission tomography (PET), digital and traditional x-ray radiography, mammography, cardiology, angiography, or neurology (XR) as well as diagnostic and cardiac ultrasound (U/S). In one embodiment the system relates to large area array monitoring or imaging systems of the type used for ultrasound or x-ray analysis and, more particularly, to systems and methods which combines high-density transducer arrays with processing circuitry.

In one embodiment of the present system, an organic interposer substrate is used to support both the ASICs and the cMUTs by flip-chip attach. The advantages of such an architecture include the flexibility of attaching components separately thereby allowing for screening of known good devices, as well as relieving the routing bottleneck from the surface of the ASICs.

A further example includes tileable and modular sensor array stackups that incorporate an organic interposer. The modules are built such that they can be placed next to each other such as within a few hundred microns thereby reducing the gap between modules and increasing sensor coverage. The organic interposer in each module provides interconnects between one or more sensor arrays on one side and one or more interface integrated circuits on the opposing side. Communication mechanisms with a control system outside of the modular array can be accomplished using input/output connectors such as ball grid array connections on the backside of the interposer. The modules themselves are tiled and can be mounted on a rigid or semi-rigid substrate wherein the rigid substrate can be glass, ceramic or other similarly rigid material. The base material also serves as the routing substrate for communication of the modules to the control system.

The system according to one embodiment provides a large area array of sensor electronics with seamless integration of sensors across the entire front surface of the array. This is a challenging task since it is necessary to bring the electrical signals from the control integrated circuit out of the sensor/integrated circuit assembly. In addition the large number of connections between the sensor array and the control electronics necessitates a fine pitch routing technology.

Figure 1:
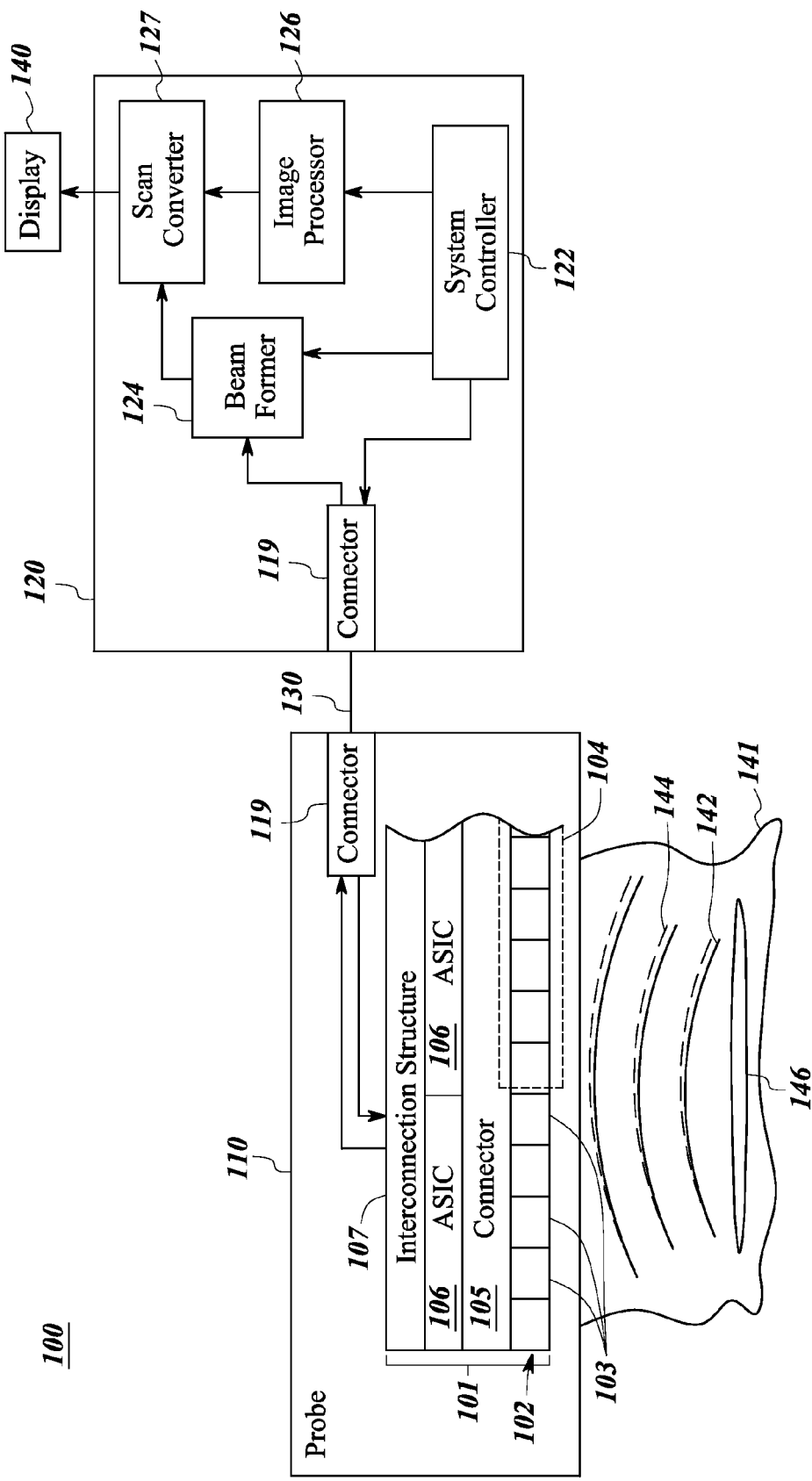
FIG. 1 is a block diagram perspective of an ultrasound imaging system.

FIG. 1 illustrates an exemplary ultrasound monitoring system 100, in this example, one of the types used for medical imaging, having a probe unit 110 that is relatively light and suitable for hand-held use. More generally, embodiments of the invention include, but are not limited to, acoustic monitoring or imaging systems that, generally, incorporate large arrays of transducers.

The system 100 according to one embodiment includes a probe unit 110 connected to a system console 120 by a multichannel cable 130 and a display 140 connected to the console 120. The probe unit 110 comprises a transducer assembly 101 having an array 102 of transducer cells 103, a connector 105, a plurality of Application Specific Integrated Circuits (ASICs) 106, and an interconnection structure 107. The console 120 includes a system controller 122, a main beamformer 124, an image processor 126, and a scan converter 127. The transducer cell array 102 includes a plurality of transducer subarrays 104, each containing a like number of transducer cells 103 arranged in columns and rows. Exemplary transducer subarrays 104 are illustrated in the plan view of FIG. 2. In other embodiments the transducer cells 103 are arranged in patterns that are tailored for the imaging application. For example, the patterns can be fashioned into a geometric shape such as a hexagon or octagon.

Each subarray 104 is coupled to a corresponding Application Specific Integrated Circuit (ASIC) 106 through the connector 105. The term processing circuitry, as used herein, refers to various types of analog or digital circuitry, which perform signal-processing functions common to imaging and monitoring systems including the system 100. For example, circuitry placed in the probe unit or in the system console, e.g., the image processor, is to be understood to include processing circuitry supportive of functions such as amplification, filtering, beam forming or image processing. Although illustrated embodiments specify locations for such circuitry, this is not at all limiting. Circuitry placed in the system console may be partly or entirely integrated within the probe unit, and circuitry in the probe unit may be positioned in a console. Moreover, some embodiments that incorporate the inventive elements may not require a console.

Information is transferred between the probe unit 110 and the system console 120 via the cable 130 that is coupled between a probe unit line connector 119 in the probe unit 110 and a console line connector 129 in the system console 120.

In the system console 120, the system controller 122 is coupled to the main beamformer 124, the image processor 126, and is also electrically coupled to the ASICs 106 in the probe unit 110 to provide necessary timing signals for operation of the system 100. The ASICs 106 typically provide electronic transmit signals to a transducer subarray 104 to generate ultrasonic pressure waves herein illustrated by ultrasound lines 142, which may return to the array as reflections 144 from an area of investigation 146 in an object 141 under study. The main beamformer 124 is coupled to the scan converter 127 to form an image for the display 140.

Figure 2:
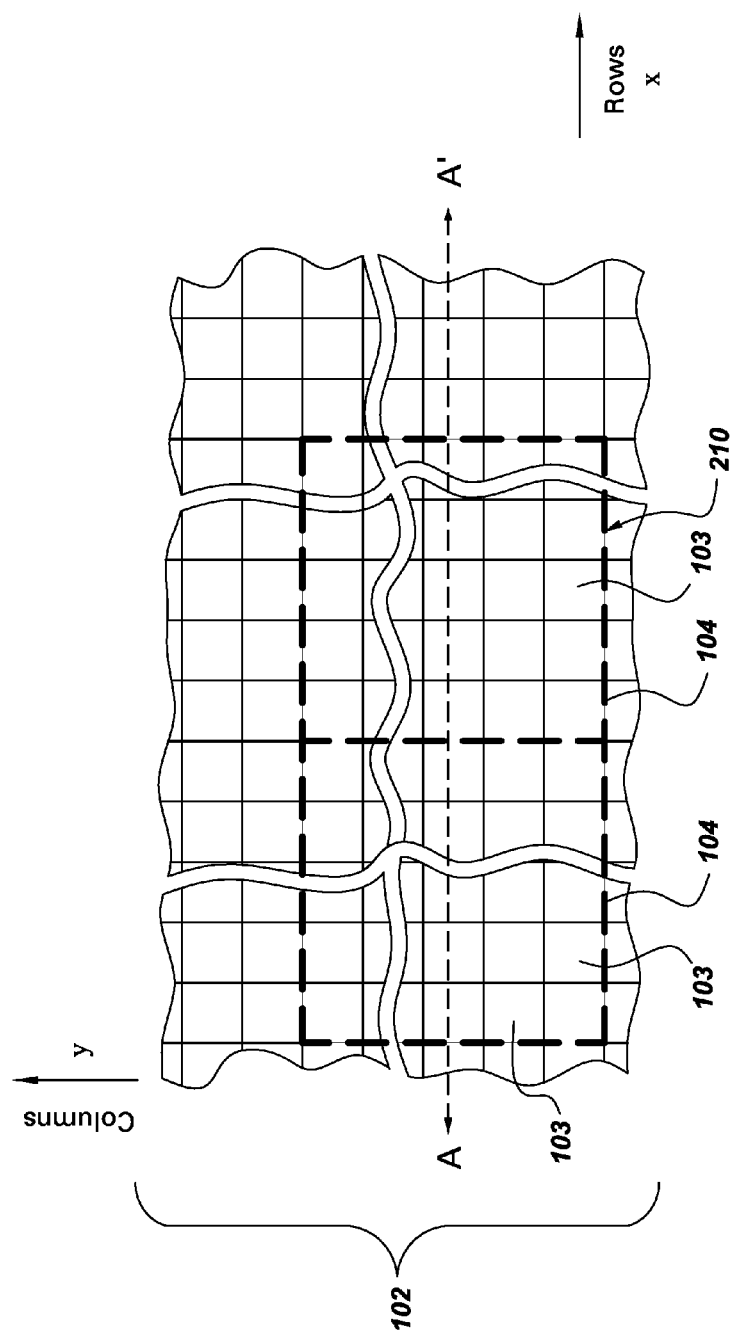
FIG. 2 illustrates in a partial plan view an array transducer assembly according to one embodiment.

Referring to FIG. 1 and FIG. 2, the plan view of FIG. 2 illustrates a transducer array 102, comprising multiple transducer modules 210, wherein the modules 210 are formed in subarrays 104 or transducer cells 103 along rows $X_i$ and columns $y_j$, and comprise corresponding ASICs 106 coupled to the transducer cells 103 through the interconnection structure 107. In one example, the transducer array 102 is functionally interchangeable with other transducer assemblies, the modules 210 are functionally interchangeable with other modules, and the transducer cells 103 are functionally interchangeable with other transducer cells. Each module 210 includes subarrays 104 of transducer cells 103 having the cells 103 arranged in rows x and columns y such that the subarrays 104, form the modules 102 and the modules form the large array 102, having the transducer cells 103 arranged along the rows x and columns y. The rows x and columns y and the modules 210 extend along a plane and, in some embodiments all of the cells 103 are positioned in the same plane. In other embodiments the cells 103 form an array 102 having curvature with respect to the plane. Each module 210, comprising a transducer subarray and a corresponding ASIC 106 is coupled to the interconnection structure 107 to form the transducer assembly 101.

Figure 3:
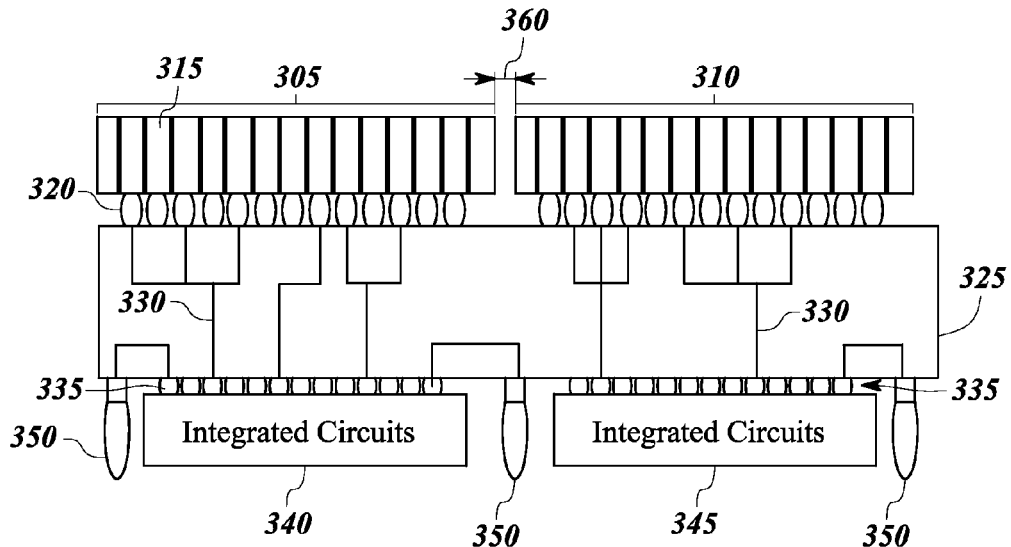
FIG. 3 illustrates a cross-sectional view of a flip chip array transducer assembly according to one embodiment.

Referring to the transducer assembly 300 of FIG. 3, which is similar to the transducer assembly 101 of FIG. 1, there are one or more sensors 305, 310 each having a plurality of transducer cells 315 forming an array. According to one example, the assembly 300 uses an interposer 325, such as a HyperBGA interposer manufactured by Endicott Interconnect Technologies, Endicott, N.Y., with a double-sided flip chip assembly. The transducer cells 315 in one example are cMUTs. As noted herein, the transducer cells 315 can be arranged in various subarrays to provide various types of sensing. The sensors 305, 310 are coupled to the interposer 325 by flip chip bonding such as by high density bumps 320 such that the sensors can maintain a very small gap 360 between the sensors thereby providing a high density cMUT sensor array with high quality imaging capability, and a small gap between adjacent die to produce the transducer assembly 300. The high-density bumps 320 provide the electrical coupling between the individual transducer cells 315 in the sensor array 305, 310 to the interposer 325.

On the opposing side of the interposer 325 are another set of high density bumps 335 that provide electrical coupling from this side of the interposer 325 to on-board integrated circuits 340, 345 such as ASICs The integrated circuits 340, 345 can provide on-board processing capability to precondition or process the sensor data. The interposer 325 provides the electrical interconnects 330 from the bumps 320 on the first side to the bumps 335 on the second side thereby electrically coupling certain transducer cells 315 to the integrated circuits 340, 345. The transducer cells 315 can be selectively coupled to the integrated circuits 340, 345 such that certain cells 315 provide certain data or redundancy of the transducer cells 315. In one example, pads 370 can be utilized for the electrical connectors 350 for the input/output connections. While not illustrated, pads can also be used for the some or all of the bumps 320, 335.

Referring again to FIG. 1 and FIG. 3, the interconnection structure 107, 330 is coupled to send and receive signals between the ASICs 106, 340, each associated with one or more of the transducer subarrays 104, 305, and circuitry, e.g., processing circuitry, in the system console 120, which is connected by the I/O connectors 350. According to the embodiments of FIGS. 3-7, the assembly 300 includes a large number of ASICs 106, 340, each connected to one or more corresponding subarray 104, 305 having a large number of transducer cells 103, 315.

In this example there are additional electrical connectors 350 such as ball grid array (BGA) balls that provide electrical coupling from the interposer 325 to external input/output (I/O) that can provide the data and/or processed data to other resources such as computing resources, storage devices, networks and/or display/printing mechanisms.

In one embodiment flip chip bonding is used and allows for modularity in the design and fabrication of the elements of the assembly. Such a design decouples the ASIC design risk from the packaging risks and can be used to create large modular arrays. The modular sensor assembly is composed of a series of sensor/ASIC modules. Each of the modules is composed of an interposer that serves as an intermediate substrate for ASIC's on the backside and sensor arrays on the front-side.

A larger number of sensor arrays improve the yield of the assembly since the smaller sensor arrays themselves have improved yield. However, a larger number of sensor arrays also reduce coverage of the sensor array somewhat due to gaps between the sensor arrays themselves. These gaps are mitigated through careful design of the tolerances on placement of the interposer and the opposing die.

The sensor and ASIC arrays are bonded to the interposer using a suitable attachment process. In one example these die are bumped using either eutectic or lead-rich solders, but is not limited to this technology. Other technologies can be used as well such as Anisotropic Conductive Film (ACF) attach, thermal compression bonding, or atomic wafer bonding.

The interposer 325 can be either a standard organic interposer, or it could contain an embedded stiffener or be composed of a ceramic or glass substrate. Signal routing within the interposer serves two functions: first it provides for redistribution of the sensor signal connections between the control ASICs and the sensor arrays in order to accommodate mismatch in pitch between the two arrays. Second, the interposer 325 is used to route the signals from the ASIC to the outside world, and these include power and ground, digital I/O and analog signal connections.

External communication is provided using connections on the backside of the module. Typically, these can be provided using BGA interconnect technology, although other interconnect technologies might be used such as thermal compression bonding or Anisotropic Conductive Film (ACF).

The modules themselves in one example are bonded to a rigid substrate in order to provide planarity uniformity of the sensor array across module boundaries. This substrate can be composed of a glass or ceramic substrate with routing of signal lines patterned directly on the substrate. It may also comprise a suitable board fabrication material such as FR4 with a stiffener to improve rigidity.

A motherboard as the substrate provides bussing of signals such as power and ground, digital I/O and analog signals between the modules. It also provides communication of these signals to the outside world through a suitable connector at the edge of the substrate panel.

Figure 4:
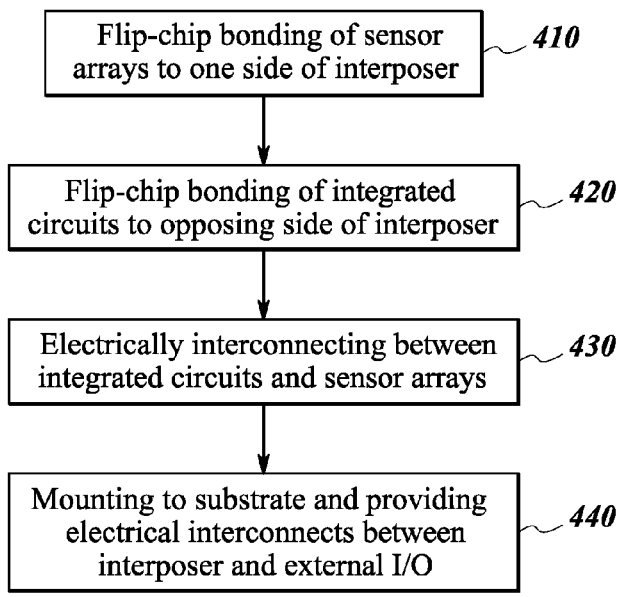
FIG. 4 is a flowchart for a flip chip array transducer assembly according to one embodiment.

Referring to FIG. 4, a simplified flowchart of the processing of the large area array modular sensor array is shown. There are several elements of the system including the interposer, integrated circuits such as ASICs, and sensor arrays. According to one embodiment, the sensor arrays are flip-chip bonded to one side of the interposer 410. The ASICs are then flip-chip bonded to the opposing side of the interposer 420 forming the transducer assembly. The interposer provides the electrical interconnects between the ASICs and the sensor arrays 430. The transducer assembly is then mounted to a substrate with additional electrical interconnects that extend from the interposer to the substrate. Since the substrate includes access to various external resources such as control circuitry, storage mechanisms and imaging circuitry, as well as input/output connections, and the interposer allows for communications from the sensor arrays and ASICs to the substrate and external resources.

Figure 5:
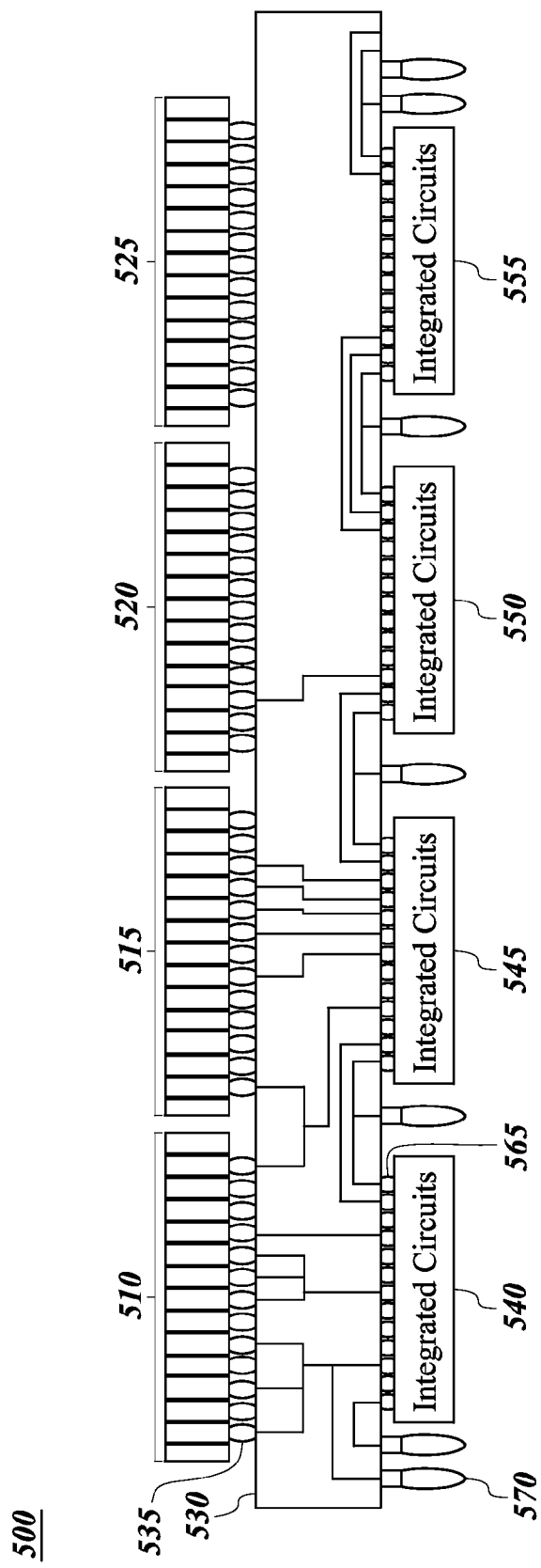
FIG. 5 illustrates a cross-sectional view of another example of a transducer assembly showing electrical interconnections according to one embodiment.

FIG. 5 illustrates a further embodiment of a transducer assembly 500 showing multiple sensor arrays 510, 515, 520, 525 that are flip chip bonded to the interposer 530 by high-density bumps 535. The sensors in this example 510, 515, 520, 525 are transducer arrays with small gaps separating the sensors thereby creating a large array size in a small form factor for applications such as in a probe. The interposer 530 provides the electrical coupling or interconnects 560 to the various numbers of integrated circuits 540, 545, 550, 555 via high density bumps 565. The electrical connections in the interposer 530 provide multiple connections from the sensors to the integrated circuits, as well as interconnections coupling between individual sensors as well as between the sensors. The interconnections include coupling signals of an ASIC as well as between ASICs. Furthermore, the interconnections also may include coupling of multiple signals from the sensors and/or the ASICs between such components. This also includes external electrical connectivity. Connections to the external resources are provided by electrical connections 570 such as BGA. In this manner, a transducer assembly of multiple sensors 510, 515, 520, 525 can be fabricated of modular components, which can subsequently be coupled with other transducer assemblies to form very large arrays.

Figure 6:
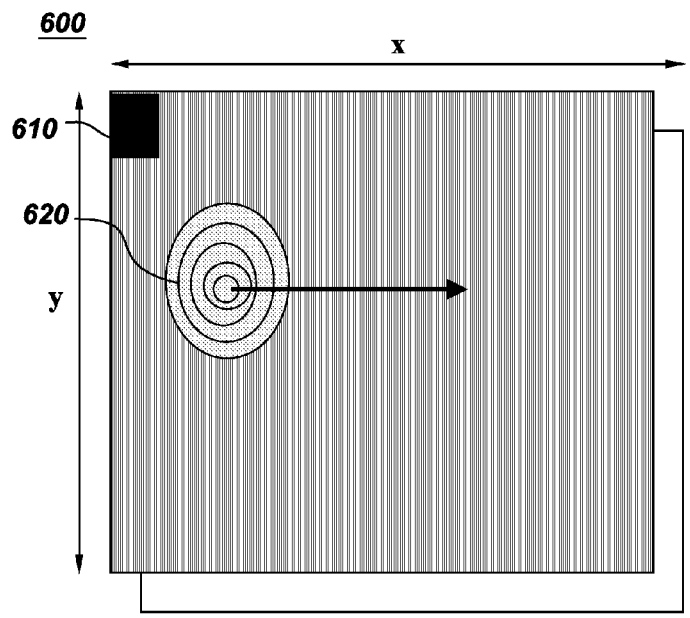
FIG. 6 illustrates a top perspective view of a large modular transducer array with a scanning aperture according to one embodiment.

Referring to FIG. 6, a large-scale transducer array 600 is shown according to one example. The transducer array 600 is comprised of multiple tileable modules 610 that are integrated into a large transducer array for various applications such as a compression plate for mammography. An aperture 620 in this example scans the transducer array 600 in order to extract the signal images to build an entire image. The size of the array and the aperture can be designed according to design criteria. In a further example, a larger transducer array can be deployed with multiple applications by utilizing a raster scan with the aperture according to the individual imaging application.

In one example, each compression plate implements Mosaic Annular Array (MAA) and the annular aperture raster scans to build up the corresponding image. For example, the aperture in a working example contains 64 rings with 185 um cMUT transducer elements. The arrays are used either for B-Mode or Through Transmission imaging. Each plate is built up out of array of 2.5 cm×2.5 cm Tileable Modules to form a total array size of 25 cm (X)×20 cm (Y). The larger array also allows for a larger aperture for the raster scans.

In a further example, the tileable modules are arranged in a pattern or shape that can be tailored for the imaging application. For example, the tileable modules can be arranged in a geometric fashion such as hexagonal or octagonal arrangement.

Figure 7A:
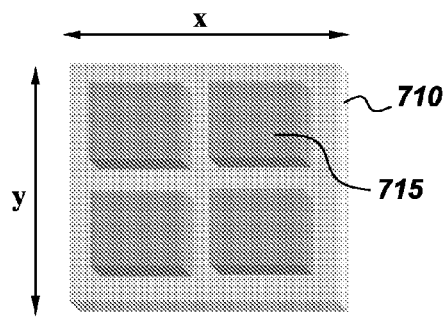
FIGS. 7a and 7b illustrates perspective views of a transducer tileable module architecture according to the invention.
Figure 7B:
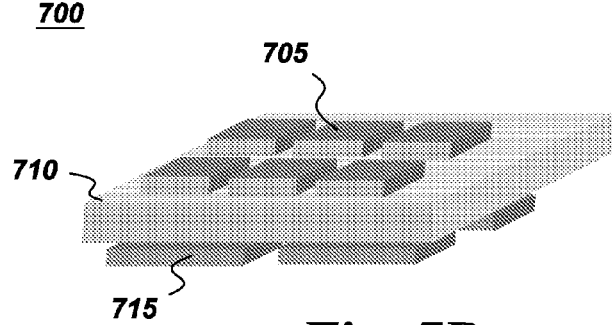

FIG. 7a and FIG. 7b depict an example of a tileable module architecture for a tileable module 700 including a number of transducer arrays 705 forming sensors that are coupled to an interposer 710 in a small form factor. There are integrated circuits 715 coupled on the opposing side of the interposer 710. BGA balls such as shown in FIG. 3 and FIG. 5 are used to couple the tileable module to an external interface. There are a plurality of transducer assemblies 705 and a plurality of integrated circuits 715 with the interposer 710 sandwiched there between and providing electrical connectivity between the transducer assemblies 705 and the integrated circuits 715.

In one embodiment the tileable module is a HyperBGA laminate substrate wherein the number of transducer assemblies 705 exceeds the number of integrated circuits 715. According to one example, the tileable module is an 8×8 device with 64 transducers, each transducer having 16×16 transducer cells. There are four ASICs allowing for a reconfigurable array with a size of about 2.5 cm×2.5 cm.

Figure 8:
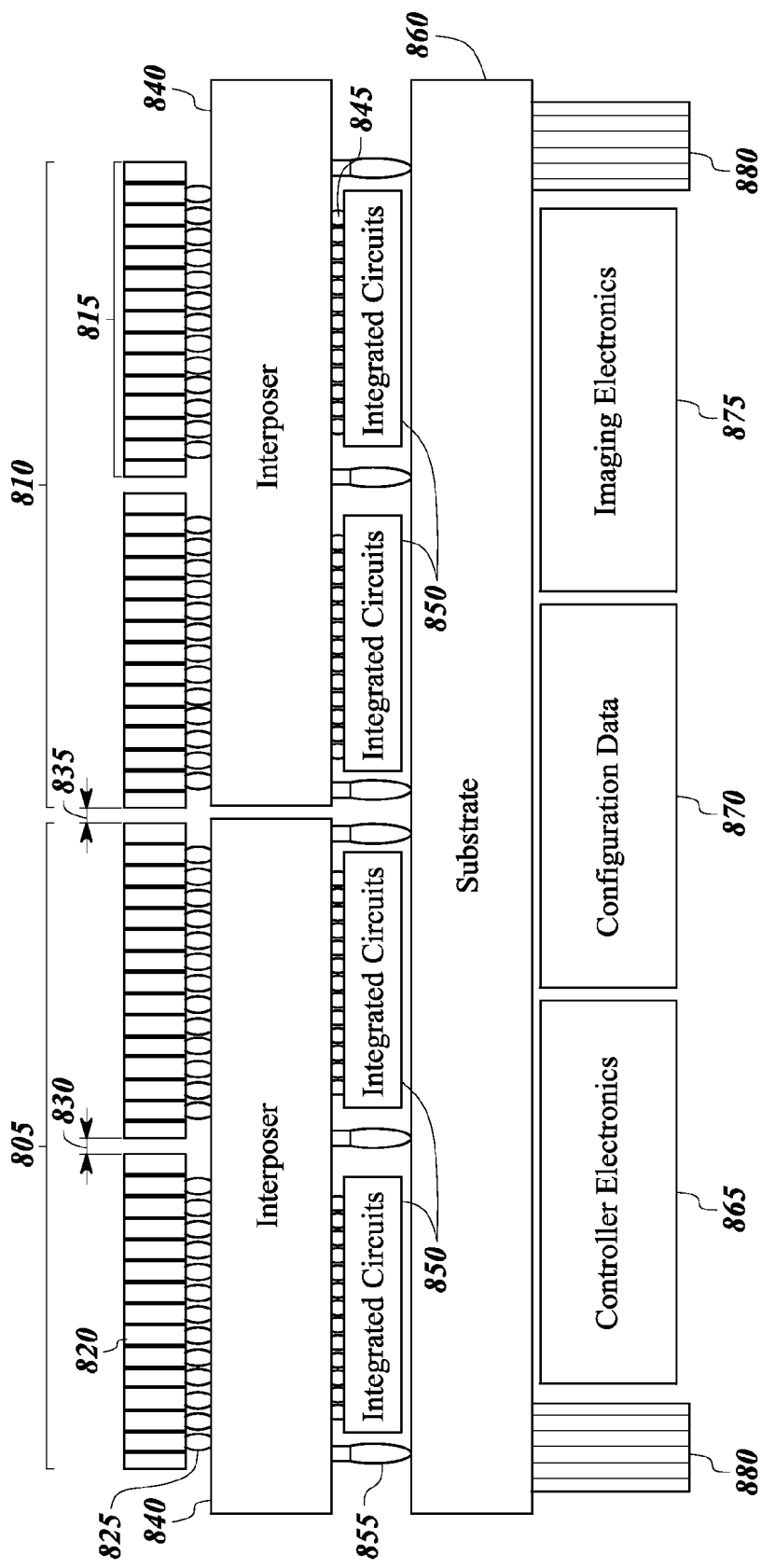
FIG. 8 illustrates in a cross-sectional view of one example of a mounted transducer modules according to one embodiment.

Referring to FIG. 8, a further transducer assembly is depicted. In this example, there are multiple tileable modules 805, 810 coupled together and connected to a substrate 860. The tileable modules 805, 810 are mounted on a substrate 860 with minimal spacing between modules to reduce gaps. In one example the substrate is a rigid substrate, such as FR4 or glass, and is capable of conducting signals. The substrate in another embodiment is a motherboard. The back-side of the substrate 860 includes the electronics for control of the transducer arrays via controller electronics 865 and accommodates such aspects as local storage of configuration data 870 and buffering for receive channels via imaging electronics 875. The electrical connections to the external resources in one example is cables or jumpers from the substrate 860 either directly or via connectors on the substrate 860.

The tileable module 805, 810 contains multiple transducer arrays 815 that each contains a number of transducer cells 820. The individual transducer arrays 815 are separated by a transducer assembly gap 830 of minimal dimensions sufficient to allow for the flip-chip ball 825 coupling between the transducer arrays 815 and the interposer 840. There is also a minimal gap 835 between adjacent tileable modules 805, 810 to maintain a small form factor and maintain functionality. The integrated circuits 850 are coupled to the interposer 840 on the side opposing the transducer arrays 815. The integrated circuits, such as reconfigurable array chips, that are coupled to the interposer by flip chip ball bonding 845. The flip chip ball bonding of the transducer arrays may be the same or different than the flip chip ball bonding of the integrated circuits.

There are BGA balls 855 that are designed to couple the interposer to the substrate 860 and thereby provide the electrical coupling between the tileable modules 805, 810 and the various electronics that is available on-board the substrate 860 and/or via the I/O connections 880. The on-board electronics allow for integration of some of the electronics of FIG. 1 to provide a more robust probe unit.

Figure 9:
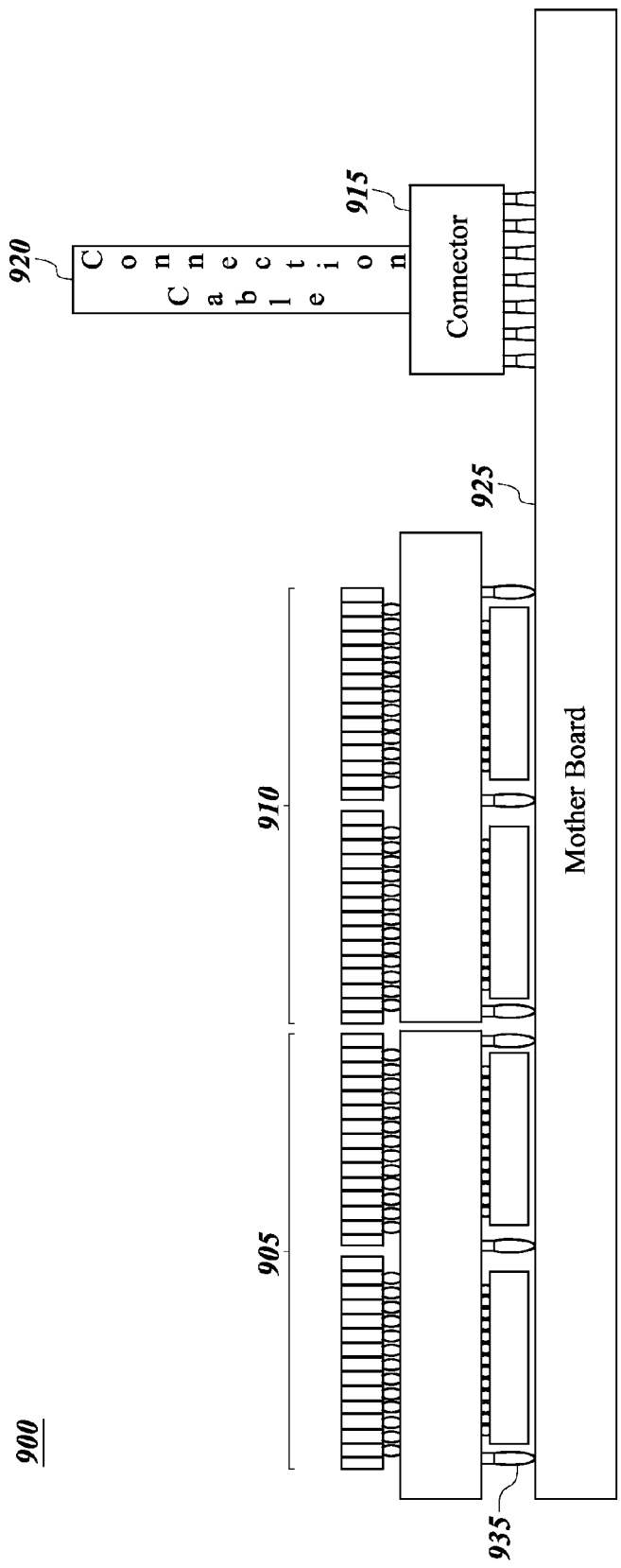
FIG. 9 illustrates a cross-sectional view of one further example of a mounted transducer module according to one embodiment.

Referring to FIG. 9, the tileable modules 905, 910, such as those depicted in the other figures, are electrically connected to a motherboard 925 by the BGA connections 935. In this example, the motherboard 925 is coupled to a connector 915 that provides an interface for a cable connection 920 that provides the interface to external resources. Such a configuration allows for the tileable modules and its sensors/ASICs to communicate to the external resources.

FIG. 10 depicts a further embodiment wherein the motherboard 1025 and the tileable modules are in an enclosure 1020 along with a coupling to a connector 1030 such that entire assembly is enclosed. The sensors, ASICs and interposer forming the tileable modules can be any of the modules detailed herein. A cable 1035 is connectable to the connector 1040 such the entire enclosed unit is modular and portable.

Figure 11A:
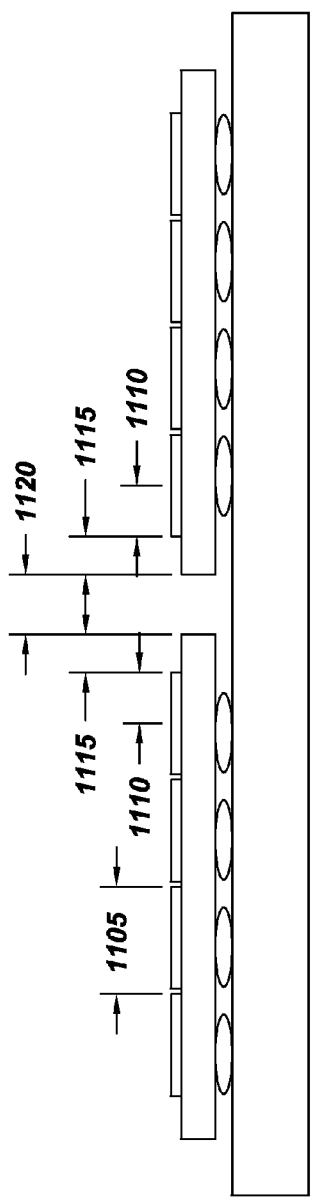
FIGS. 11a and 11b illustrate in a cross-sectional view of a transducer module showing the spacings between dies and modules according to one embodiment.
Figure 11B:
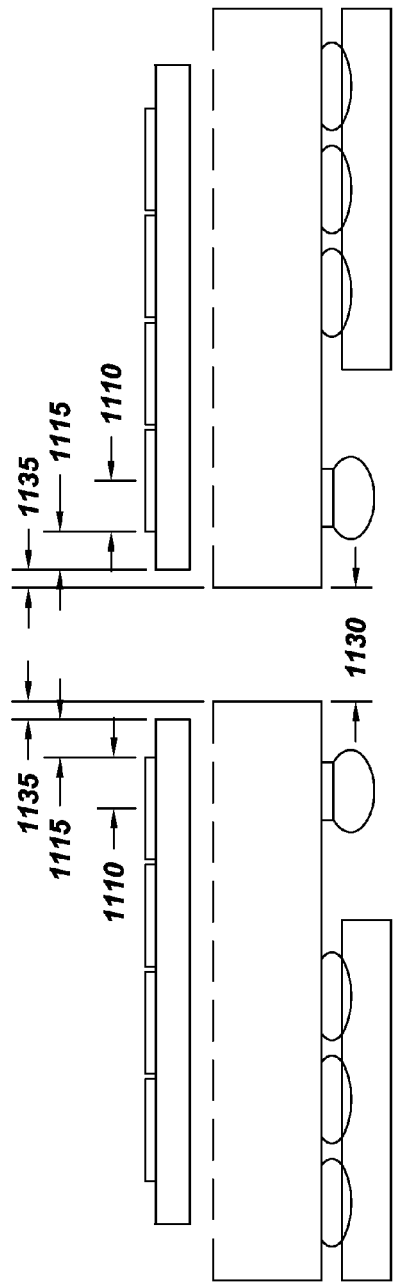

FIGS. 11a and 11b illustrate the spacing in microns (um) between die and between modules according to one embodiment. The gap dimensions in the FIG. 11a example shows the cMUT pitch 1105 as being about 185 microns; chip edge to chip edge placement 1120 of about 100 microns; dicing/chipping tolerance 1115 of about 50 microns; cMUT center to cMUT edge 1110 of about 92.5 microns; and cMUT center to cMUT center as about 385 microns which is the sum of the other dimensions.

Referring to FIG. 11b, the module to module edge placement 1130 is about 100 microns; the chip edge to substrate edge placement 1135 is about 0 microns; the dicing/chip tolerance 1115 is about 50 microns; cMUT center to cMUT edge 1110 is about 92.5 microns; the cMUT center to cMUT center is about 385 microns.

Figure 12:
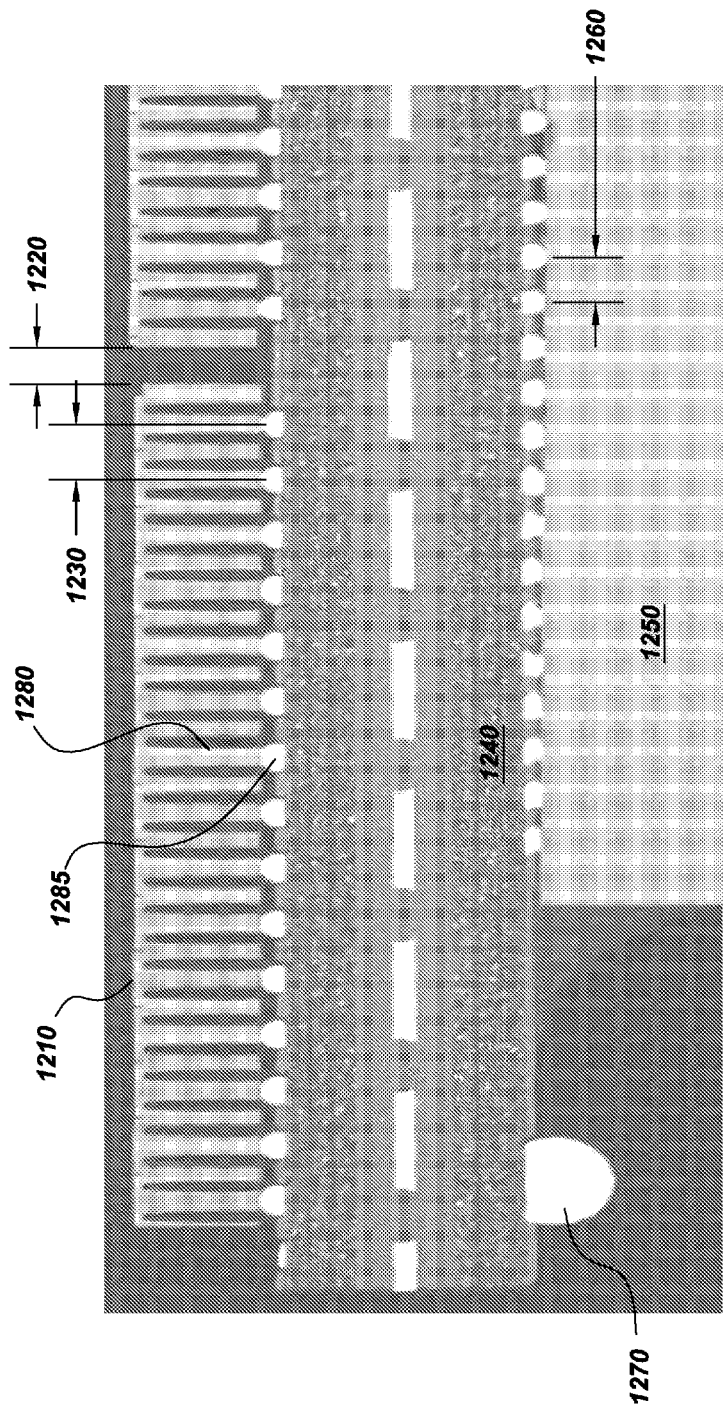
FIG. 12 shows an actual image of a mechanical cMUT flip chip attached on the top of an interposer.

Referring to FIG. 12, this figure shows a SEM image of proof of concept design. As illustrated, a sensor device 1210 is flip chip attached on the top of the no internal plane (NIP) organic interposer 1240, along with the integrated circuit device 1250 flip chip attached on the backside of the interposer 1240. The organic interposer 1240 in one embodiment comprises polytetrafluoroethylene (PTFE) also known under the trademark Teflon®. The PTFE chip carrier or interposer 1240 is an organic material that has good electrical conductive properties as well as being mechanically reliable. In one example, the organic interposer is comprised of polytetrafluoroethylene (PTFE) reinforced with a copper-invar-copper (CIC) center core to control the flatness and coefficient of thermal expansion (CTE). The sensor device 1210 is flip chipped to the interposer 1240 and does not use an underfill.

In one embodiment the sensor device 1210 is a trenched sensor having pillars 1285 that are electrically coupled to the organic interposer 1240 by the balls 1285. The design of the trenched sensor device 1210 provides enhanced mechanical stability. In one example, the sensor device is a trenched cMUT that is flip chipped to the PTFE chip carrier.

According to one embodiment, there is a minimal gap 1220 between adjacent sensors 1210 to accommodate multiple sensors. There is a pitch of the sensor electrical interconnect 1230 that in this example is 185 microns and the pitch of the integrated circuit 1250 electrical interconnect 1260 is 150 microns. A solder ball 1270 is also shown on the backside. Note in this figure the backside ASIC 1250 die in not thinned; however, in one design embodiment, this die will be 250 um in thickness that will permit the I/O connector 1270 to be connected to a substrate (not shown).

In more particular detail of one example, the trenched cMUT device is attached to the topside of a laminate interposer. The top portion of the pillar 1280 is attached to an active area of the silicon device, which is only about 22 um in thickness. A trenched cMUT device having a 85 um square pillar that is 250 um long is attached to a Teflon-based organic interposer using flip chip attach. The cMUT pillars are bumped with eutectic Sn—Pb solder. One example includes a solder bumped trenched cMUT device wherein an under bump metallurgy (UBM) structure is deposited on the pillar and then bumped with solder. This bumped trenched device is then flip chip solder attached to the topside of the laminate interposer. When these bumped trenched devices are attached to the interposer, the cMUT devices remain flat, and are spaced about 100 um apart. On the backside of the interposer an ASIC chip with a 150 um pitch and >4000 I/Os are flip-chip attached and underfilled. Also, ball grid array (BGA) spheres are attached on the backside and the BGA balls are used to attach the module to a board.

Figure 13:
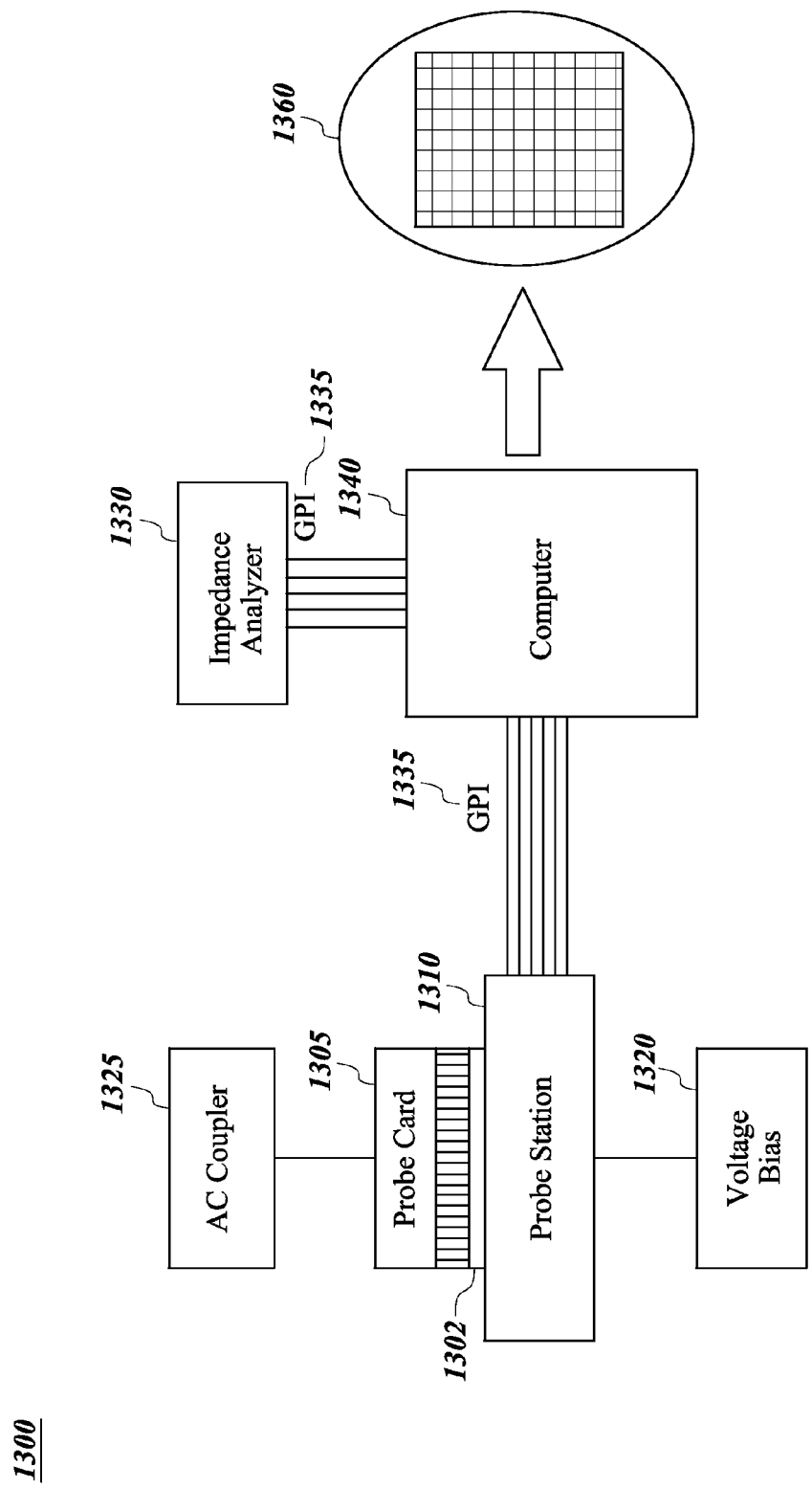
FIG. 13 illustrates a test system diagram according to one embodiment.

One example of a test system 1300 used to generate a wafer map 1360 is shown in FIG. 13 wherein the cMUT wafer 1302 is coupled to a probe card 1305 that is part of the probe station 1310. The probe station 1310 is coupled to various sources and measurement devices. In this example, there is a voltage bias 1320 coupled to the probe station 1310 and AC coupler 1325 coupled to the probe card 1305. A computing device 1340 is communicatively coupled to the probe station 1310 such as via a general-purpose interface (GPI). The computer 1340 is also communicatively coupled to an impedance analyzer 1330 such as via the GPI. The impedance analyzer 1330 is also coupled to the AC coupler 1325. The computer 1340 processes the information which may include metrics and generates the wafer map 1360.

In another example, the interposer can be tested by applying analog waveforms to the common electrode and looking for shorts in the transducer assembly and opens at the signal BGA connections.

Figure 14:
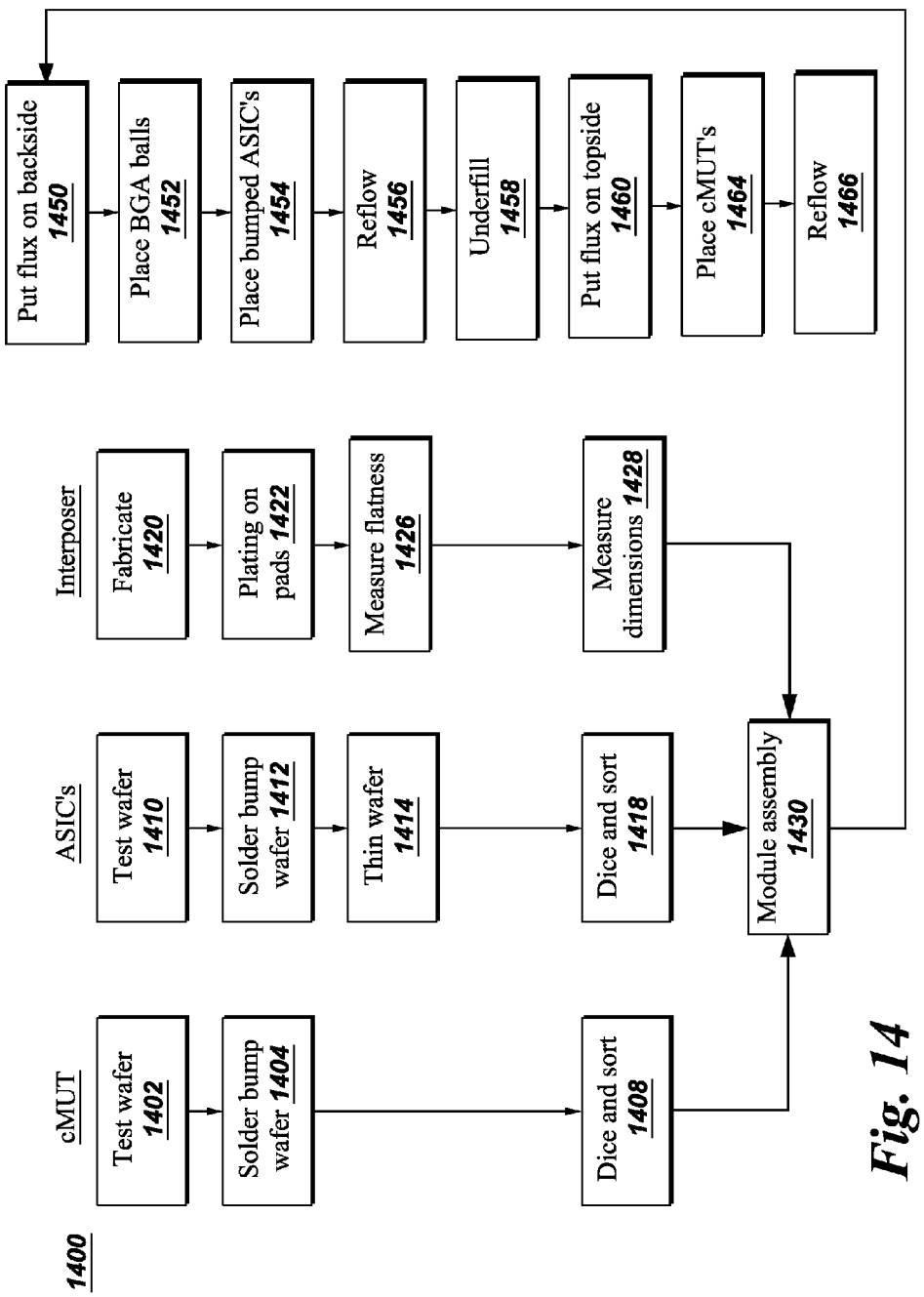
FIG. 14 shows a flowchart for the large area sensor array according to one embodiment.

A detailed flowchart showing processing of a large sensor array is depicted in FIG. 14. The main elements of the module assembly in this embodiment include the cMUTs, ASICs, and interposer. Each of these elements has certain processing steps that may be undertaken prior to the integration into the module assembly. Furthermore, the processing steps for the integration in this example are also illustrated. It is noted that other embodiments may have different steps and more or less steps in the processing. It should be understood that these steps are just one example and there may be additional steps, omitted steps and there is no specific sequence unless noted.

For the cMUT processing, the cMUT wafer is provided and tested 1402 to ensure there are no significant defects and to ensure there is an adequate population of non-defective units. Solder bumps are applied to the cMUT wafer 1404 by any of the methods detailed herein. An optional step is to test the bumped die to ensure that the bumps are properly applied and electrically conductive. The wafer is then subject to dicing and sorting of the wafer 1408. In one embodiment a waffle pack is used.

For the integrated circuit processing such as ASICs, the wafer is typically tested 1410 and then subject to solder bumping 1412. The solder bumping can be any of the forms detailed herein. The wafer is thinned 1414 to the desired thickness for the application criteria. The wafer may be optionally tested to ensure the processing has not damaged the wafer. The IC wafer is then subject to dicing and sorting 1418. An optional waffle pack can be utilized with the IC wafer.

The interposer is fabricated according to the design specifications or otherwise procured for the application requirements 1420. In some examples, the interposers are more generic while others require special design. ENIG plating can be done on the top and bottom pads 1422 of the interposer. An optional electrical test is may be performed. The interposer is subject to certain analysis such as measuring flatness and subject to sorting 1424. Further analysis includes measuring the interposer dimensions and sorting 1428.

The cMUTs, ASICs and Interposers are then subject to module assembly 1430. The module assembly commences with dispensing flux on the backside of the interposer 1450. Ball grid array (BGA) balls are then placed on the backside 1452. The ASICs with its bumps are aligned and placed onto the BGA balls of the interposer 1454. Reflow is performed to remove the flux 1456. An optional electrical test can be performed on the bump bonded ASICs. Underfill is applied to the interposer backside to keep the components secured in place 1458. Flux is dispensed on the top side of the interposer 1460 and the cMUTs with its bumps are aligned and placed onto the top side of the interposer 1464. Reflow is performed 1466 to remove the flux. Optional testing can be performed to check the electrical interconnections. In this configuration a very thin device, which is only 50 um thick, is used to build the active cMUT die. The backside is comprised of a perimeter trench surrounding a pillar having dimensions of 90 um×90 um×200 um. The tip of the pillar is deposited with a 70 um diameter under bump metallization (UBM) pad along with a low melt solder bump. This fragile device can be attached to the interposer without the need of an underfill due to the compliant nature of the PTFE interposer and the high standoff of the interconnect that is comprised of the long pillar (200 um) along with the solder ball height that provides for a low stress interconnect design.

The interposer may also provide communication between the individual neighboring integrated circuit, which communication provides cohesive operation of the entire system.

The advantages of the present module include a modular assembly for ease of rework, near-perfect distributed sensor array with small gaps, and uniform co-planarity across the entire array. The modular framework allows for modular assembly, connection between ASICs in the interposer, double-sided flip-chip packaging, mounting modules on glass, cMUT sensor tileable array with flat substrate to ensure (X, Y, Z) close dimensions, small sensor tileable/reworkable, and stack-up/small cMUTs (for high yield).

The same interconnect layer is used to provide connections to the elements and to the I/O. In this example a single module with multiple ASICs all share largely the same I/O (including analog and digital I/O) in order to greatly reduce the number of required I/O connections on the module. In one example the interconnect layer provides connections between ASICs in the module.

In a further example, the ASIC cells are made smaller (different pitch from the array) in order to accommodate both the I/O on the perimeter of the die as well as the BGA balls outside the die. The signals in one example are routed through the die in order to reduce required routing in interposer. The module can be comprised of multiple smaller cMUT die in order to improve yield (by sorting the die before placement on the interposer) and reduce effects of CTE mismatch. One further advantage is that underfill is not used on the cMUT side in order to eliminate fillet and closely space the die.

The ASIC die may be thinned in order to reduce fillet and thereby reduce the keepout region around the ASIC and increase the size of the unit cells. The die are thinned so that the BGA balls can clear the backside. High-melt balls can be used on the integrated circuits followed by low-melt used on transducer assembly. Solder bumping balls can be any one of solder-jetted, electroplated, evaporation, plated plastic spheres, solder ball transfer, or any other suitable solder technology.

A further aspect includes stacking additional die on the integrated circuit side using through Silicon vias (TSV's) in the die. Another aspect includes having an additional layer of ceramic between interposer and the transducer assembly for stress relief on the transducer assembly.

In one embodiment the gap is 100 um or smaller between modules and the die is flush with the substrate.

Another aspect is having modules pluggable with a socket or solderable BGA's. According to one aspect, the present system is a Field Replaceable Unit (FRU) due to the modular design and connectivity. One method of assembly includes having a large area array and testing each module before assembly in order to have high yield. The method includes replaceable transducer assemblies due to the lack of underfill, with the ASIC having high-melt balls to allow for additional reflowing.

In one aspect, an Anisotropic Conductive Film (ACF) is used for attachment of the interposer to the integrated circuit and/or transducer assembly.

For example, the interposer can be a Silicon interposer substrate with BGA's coupled to the substrate. In one example the interposer is a glass board with routing on the board. One example is a large array (20 cm×25 cm and greater) composed of the individual tileable modules. Further details about interposers and tiled transducers are described, for example, in commonly assigned U.S. Pat. No. 7,375,420 that is incorporated by reference for all purposes.

In one embodiment, an ultrasonic monitoring system is formed with a probe unit having an array of transducer cells arranged in rows and columns and formed along a first plane with a first pitch along a first direction. An integrated circuit including an array of circuit cells is formed along a second plane parallel to the first plane. The circuit cells are spaced apart along the first direction at a second pitch smaller than the first pitch. A first of the transducer cells is vertically aligned, along a direction normal to one of the planes, with a first of the circuit cells and having a connection thereto, and a second of the transducer cells is offset from vertical alignment with respect to the position of a second circuit cell so as to not overlie the second circuit cell. A connection subsystem is positioned between the array of transducer cells and the array of circuit cells, configured to form the connection of the first transducer cell to the first circuit cell and to connect the second transducer cell with the second circuit cell. An interconnection structure is positioned to provide electrical connections between the integrated circuit and processing circuitry.

According to one embodiment, one method of forming an ultrasonic imaging system having transducer circuitry includes providing an array of transducer cells along a first plane with a first pitch along a first direction, and providing an integrated circuit device comprising an array of circuit cells and comprising a plurality of I/O pads formed along an edge of the device. The circuit cells are formed along the first direction with a second pitch smaller than the first pitch, with a first of the cells overlying a first circuit cell along a direction normal to the first plane, for connection thereto, and with a second transducer cell offset with respect to the positions of the first transducer cell and the first circuit cell so as not to overlie the second circuit cell. A redistribution system is configured to route a connection between the second cell and the second circuit cell. An interconnection structure is provided which comprises an array of connectors. The connectors provide connections between I/O pads of integrated circuit structures in a plurality of transducer modules and electronic components of an ultrasonic imaging system.

One aspect discloses modules wherein the integrated circuit is a different size than the interposer, such as smaller, or having the module incorporating multiple integrated circuits in the module.

A further aspect discloses interconnections between die in the module and grouping/bussing of signals from the pads to reduce the overall I/O of the package.

The conventional art is typically not a modular construction and does not disclose interconnect structure/interposer made of Teflon® or other rigid organic substrates.

The present method and system provides a lower cost manufacturable transducer assembly, utilizing existing manufacturing technologies for grouping/bussing signals in the interposer, with the integrated circuit smaller than the interposer to allow for BGA coupling. This design further provides for smaller cMUTs that are not underfilled.

One further example is a large area reconfigurable imaging array developed with co-integrated cMUTs and control electronics that can be used as a compression plate architecture. Such a system can be used to replace X-ray mammography and/or be used in conjunction to such mammography such as ultrasound specificity for dense tissue. The device is a 2.5 cm 2D tileable module with >16,000 transducer sub-elements spaced at a pitch of 185 um in X and Y dimensions. As a demonstration, a multi-row linear array using cMUTs and multiplexing electronics was designed and fabricated. A trenched cMUT was attached to a laminate interposer as part of a tileable module. The architecture of the tileable module demonstrated manufacturability, reliability, acoustic planarity, and reduced spacing between tiles and cMUT chips.

Another embodiment is a standardized packaging platform that can be used in multiple applications and embodiments. While the described examples are for cMUT sensors, PZT crystals can be implemented in place of the cMUTs.

While numerous embodiments of the system have been illustrated and described, the invention is not so limited. Numerous modifications, variations, substitutions and equivalents will occur to those skilled in the art without departing from the spirit and scope of the present invention.

What is claimed is:

1. A large area modular sensor array assembly comprising:
    at least one tileable module, said tileable module comprising:
        a plurality of transducer cells forming at least one sensor;
        an organic interposer bonded on a first side to the plurality of transducer cells;
        one or more integrated circuits bonded to a second side of the interposer, wherein the interposer includes a plurality of electrical interconnections to at least some of the transducer cells and to at least some of the integrated circuits; and
        at least one input/output connector having a length extending substantially orthogonal to the interposer and providing an external interface, wherein the length of the input/output connector is greater than a thickness of the integrated circuits; and
    a substrate coupled to the tileable module and electrically coupled to the input/output connector.

2. The assembly according to claim 1, wherein the sensor is a trenched sensor having a plurality of pillars coupled to the first side of the interposer.

3. The assembly according to claim 1, further comprising a solder bumped under bump metallurgy (UBM) pad deposited on a tip of the pillar and the bumped pillar is solder attached to the interposer.

4. The assembly according to claim 1, wherein the trenched sensor is a Capacitive Micromachined Ultrasonic Transducer (cMUT).

5. The assembly according to claim 1, wherein the organic interposer is comprised of polytetrafluoroethylene.

6. The assembly according to claim 1, wherein the input/output connector is a ball grid array (BGA) ball.

7. The assembly according to claim 1, wherein each tileable module comprises two or more sensors and two or more integrated circuits coupled to said interposer.

8. The assembly according to claim 1, wherein the substrate is electrically coupled to at least one of a controller, a storage medium and an imaging circuit.

9. The assembly according to claim 1, wherein the substrate is a rigid or semi-rigid substrate.

10. The assembly according to claim 1, wherein a first tileable module is coupled to a second tileable module by a module interconnect in said interposer.

11. The assembly according to claim 1, wherein the substrate is a motherboard providing a base for the tileable modules and coupled to at least one of the input/output connectors.

12. The assembly according to claim 11, further comprising at least one connector and at least one cable coupled to the motherboard.

13. The assembly according to claim 12, further comprising an enclosure housing the tileable modules, motherboard and connector.

14. The assembly according to claim 1, further comprising a cable connector coupled to the substrate providing an interface to the external resources via cables to the cable connector.

15. The assembly according to claim 1, wherein the assembly is configured to form at least one compression plate, each compression plate comprising a two-dimensional transducer array of the tileable modules and having an annular aperture for mammography scanning.

16. A method of forming a large area modular sensor array assembly, comprising:
    providing a motherboard;
    coupling one or more tileable modules to said motherboard, said tileable modules comprising:
        bonding a plurality of transducer cells to a first side of an interposer by a plurality of first side bumps;
        bonding at least one integrated circuit to a second side of the interposer by a plurality of second side bumps;
        providing a plurality of electrical interconnections in said interposer coupling the transducer cells to the integrated circuits; and
        forming an input/output connection on the interposer, wherein said input/output connection exceeds a thickness of said integrated circuit thereby providing an electrical connection to said motherboard.

17. The method according to claim 16, further comprising coupling at least one connector to said motherboard and connecting at least one cable to said connector.

18. The method according to claim 16, further comprising coupling one or more external resources to said motherboard.

19. A transducer sensor array, comprising:
    a plurality of transducer cells with some of said transducer cells forming at least one trenched sensor;
    one or more integrated circuits, each integrated circuit having a defined thickness;
    an organic interposer sandwiched between the transducer cells and the integrated circuit, said transducer cells bonded to a first side of the interposer, the integrated circuits bonded to a second side of the interposer, wherein the interposer includes a plurality of electrical interconnections between at least some of the transducer cells and at least some of the integrated circuits;
at least one input/output connector bonded on the interposer on a same side as the integrated circuits and having a length greater than the defined thickness of the integrated circuit, wherein the input/output connector is electrically coupled to at least one of the transducer cells or the integrated circuits;
a substrate electrically coupled to the input/output connector; and electrical connections from the substrate to external resources.

20. The transducer sensor array according to claim 19, wherein the interposer is comprised of polytetrafluoroethylene (PTFE) and the trenched sensor has a plurality of pillars bonded to the interposer.

* * * * *